United States Patent

[11] 3,540,415

| [72] | Inventor | James E. Bromley<br>6121 Jasmine Road, Pensacola, Florida 32503 |
|---|---|---|
| [21] | Appl. No. | 817,470 |
| [22] | Filed | April 18, 1969 |
| [45] | Patented | Nov. 17, 1970 |

[54] SYNTHETIC REEF ECOLOGICAL SYSTEM FOR LARGE BODIES OF WATER
8 Claims, 9 Drawing Figs.

[52] U.S. Cl............................................... 119/3; 261/77; 119/5
[51] Int. Cl........................................................ A01k 61/00
[50] Field of Search.......................................... 119/3, 5, 4; 261/77

[56] References Cited
UNITED STATES PATENTS

| 3,118,424 | 1/1964 | Willinger | 119/3 |
| 3,452,966 | 7/1969 | Smolski | 261/77 |
| 3,464,385 | 9/1969 | Pellett | 119/3 |

Primary Examiner—Aldrich F. Medbery
Attorney—Stanley M. Tarter, George R. Beck and Roy P. Wymbs ABSTRACT: A synthetic reef for installation on the floor of large natural or manmade bodies of water is provided to facilitate the colonizing of harvestable fish therefrom. The reef is made of a flexible perforated base material weighted sufficiently so that the reef is submergible to the floor. A plurality of spaced-apart thin elongated ribbonlike members are attached at one of their ends to said base material and have a density sufficiently low so that when the reef is submerged the other ends of the members will tend to float upward. A method of installing such a reef is also disclosed.

Patented Nov. 17, 1970

3,540,415

INVENTOR.
JAMES E. BROMLEY
BY Stanley M. Tarter
ATTORNEY

Patented Nov. 17, 1970

INVENTOR.
JAMES E. BROMLEY

BY Stanley M. Tarter

ATTORNEY

SYNTHETIC REEF ECOLOGICAL SYSTEM FOR LARGE BODIES OF WATER

BACKGROUND OF THE INVENTION

Expanding human population intensifies the need for new or enlarged supplies of foodstuffs. The seas, oceans and lakes of the world are recognized as major possible sources of food materials during the next several decades. Aquatic life, both floral and faunal, is being investigated for sources of nutritional values, particularly of proteins. Several systems of aquaculture have been used in which certain species of fish or shellfish have been cultivated in lakes and ponds and in restricted areas of shallow coastal waters and estuaries.

Recent developments in fish-processing technology has made it commercially feasible to convert many types of marine fish residues into a edible odorless flour after other valuable components have been extracted; even scrap fish, formerly discarded or used for cat food, are now recoverable economically as flour suitable for human consumption. The increasing diversity of usable varieties of fish makes the development of fish havens in the open seas more economically attractive.

Although great schools of fish may stray far from their usual habitat, particularly during the spawning season, more commonly they congregate in regions having an abundant food supply, compatible temperature range and salinity, physical shelter from natural enemies, etc. The ultimate living food supply of even the larger fish of commerce goes back through a chain of interdependent fauna and flora to simple organisms such as zoo and phytoplankton. Balanced ecosystems frequently occur in oceanic regions that include natural reefs or beds of sea plants which support self-perpetuating fish populations.

Vast regions overlying much of the continental shelf and slope of the continents are relatively barren of reefs or other suitable outcroppings, and are correspondingly low in stable fish populations. Moreover, in recent years many of the great kelp beds have been increasingly denuded by the steady onslaught of sea urchins; poisoning the sea urchins and replanting kelp has even been undertaken in selected areas. Some coral reefs in the Pacific are reported as being attacked by a prolific species of spiny starfish that ingests the living coral polyps, presenting a long term threat of destruction to such natural reefs.

Many materials and structures have served as artificial reefs. Among those installed off the coast of California and carefully studied over a sufficient time interval are the following:

1. Large hollow concrete blocks stacked in an ordered array on the ocean floor. Census of fish and marine organisms taken over a period of years showed that this artificial reef was quite effective in establishing stable fish populations. High costs of materials, hauling, and underwater labor make this kind of structure impractical for large-scale commercial use, however.
2. Field stones dumped overboard and allowed to pile up at random on the ocean floor. This structure satisfactorily attracted fish populations though considerably less effectively than stacked hollow concrete blocks. Prohibitively high hauling costs make this structure questionable for large scale application.
3. Old automobile bodies dumped overboard and allowed to settle at random. The established fish populations were quite sparse, and rapid corrosion by sea water makes the effective life of these structures very short. The hauling costs are not justifiable on the sole basis of functioning as a reef.

Other artificial reefs made by chaining together a number of old automobile tires weighted with concrete are reported to attract fish in shallow water. Large molded concrete tetrapods and hexapods have been suggested for sea barriers near the shore so that sandbars may shoal up to reduce further erosion of the shore line; these multilegged concrete pods interlock together as they fall upon one another, and might serve as a temporary fish haven.

New fish havens must be established on a large scale if the worldwide populations of fish in the open seas are to be significantly increased by these means. That is, in each of many selected oceanic regions several square miles of the sea floor must be covered with reefs. None of the above mentioned artificial reefs can be regarded as economically feasible for this purpose; the low ratio of "effective volume" to weight makes installation costs unacceptably high. Effective volume is the free space within the structure that is accessible to the marine biota. Many hundreds of thousands of tons of field stones, for example, would be required to construct a reef of appreciable size, yet the crevices and interstices between the stones would constitute a relatively small effective volume.

BRIEF SUMMARY OF THE INVENTION

The general objective of this invention is to provide in the open sea a fully submerged synthetic reef which serves as the physical nucleus of a regional ecological system capable of sustaining stable fish colonizations and populations that may be harvested periodically by conventional commercial fishing techniques, such as angling, trawling, and seining. The reef structure comprises a portion of the sea floor covered with a base material of perforated plastic sheet or of coarse mesh fabric to which is attached at least one end of each one of a multiplicity of long buoyant plastic fronds or ribbons, the points of attachment forming a spaced array distributed over the entire upper surface of the base material; the base sheet is anchored to the sea floor initially by discrete nonbuoyant weights and ultimately by a combination of these weights and a thin layer of detritus deposited from the surrounding water.

Another objective of the invention is to provide an assembly of the major components of a synthetic reef structure, the assembly being preformed on shore or on shipboard prior to its being submerged in the sea; the assembly includes a base of perforate sheet material to one surface of which is attached at least one end of a multiplicity of buoyant plastic fronds or ribbons.

DESCRIPTION OF THE INVENTION

The term, "sea floor" in the following description is intended to include the nominal surface of the earth's crust at the bottom of a sea, ocean, gulf, bay or a large body of fresh water, such as a deep lake, it being understood that this surface is actually covered by an appreciable depth of water.

Figure 1:
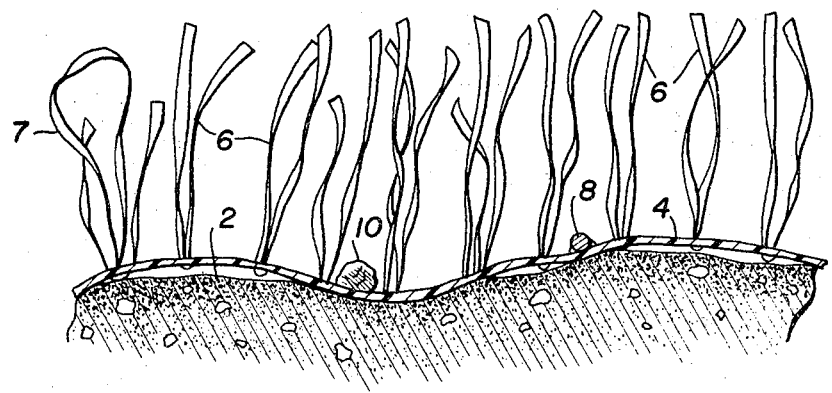
FIGS. 1 and 2 represent a sectional elevation of a small portion of a synthetic reef as it is initially installed on the sea floor.

The invention may be understood by referring to FIG. 1 which shows a small section of a newly installed synthetic reef. A portion of the sea floor 2 is covered by flexible perforated plastic sheet material 4 to which is attached a large number of ribbonlike buoyant plastic strips 6. These strips may be referred to as "fronds" by analogy to some of the sea plants they resemble. Generally, the frond has one free end, the other end being attached to the base sheet material 4; however, both ends may be attached to yield a frond in the form of a large open loop 7. Weights 8, such as steel bars or ceramic rods, are attached to base material 4 at intervals sufficient to ensure a net negative buoyancy for the whole assembly, causing it to sink to the sea floor initially; additional weights 10, such as broken rocks 10, are distributed at random over the base sheet 4 to provide further anchorage for the structure, if needed.

Figure 2:
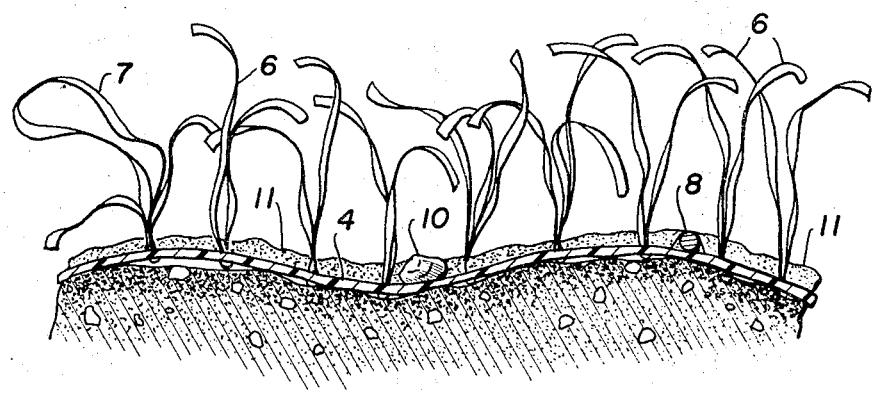

FIG. 2 illustrates the appearance of the reef structure shown in FIG. 1 after the lapse of about one year or longer. A thin layer of detritus 11 has accumulated over the base material 4 which has become securely anchored; even quite strong bottom currents do not displace the base once a continuous layer of detritus an inch or two thick has been deposited. The strips or fronds 6 now have a greater tendency to bend over at the free ends because the accretion of small marine organisms and their byproducts on the surfaces has reduced the net positive buoyancy of the fronds.

The base sheet material 4 is perforated to provide at least 35 percent open area, preferably 75—95 percent. With less than 35 percent open area the sheet does not settle smoothly even in calm water and is easily shifted or furled by bottom currents. Above 95 percent open area, except for net fabrics, the sheet becomes too weak structurally to withstand the stresses of handling. Net fabric either spun directly from synthetic polymer or knitted from strands or filaments is generally preferred because of ease of handling in the water and its overall low cost. Metal wire net such as wire cloth or chicken wire is also suitable but may be unduly expensive for large installations; ordinary steel wire net must be specially coated to resist sea water corrosion if a useful reef lifetime is to be achieved.

Desirably the base sheet material itself has negative buoyancy; i.e., the density of the material is greater than the density of sea water at the temperature and pressure existing at the sea floor where the reef is installed. Some of the more common synthetic plastics, such as Nylon 6 and Nylon 66, cellulose acetate, and polyethylene terephthalate, satisfy this condition; scrap polymer and yarn of these types may be used to produce base sheet since quality standards are less critical than for regular textile and industrial yarns. However, because of cost advantage, polyolefins, such as polyethylene and polypropylene, are highly desirable, additional ballast weights being used to compensate the positive buoyancy of these materials.

In contrast with the base sheet material, the fronds must have a net positive buoyancy under the physical conditions existing near the sea floor. To have a useful service life in the reef, each frond must displace a weight of sea water that exceeds its own weight by at least 3 percent, preferably by 4 percent to 25 percent; i.e., the gross density of the frond should be in the range of about 0.80 to 0.97 gms/cm$^3$ under the pressure of 2 atmospheres. With densities above 0.97, fronds tend to droop after about one year because of the previously mentioned marine accretions; with a frond density much below 0.80 the difficulty and cost of anchoring the base sheet becomes excessive with few compensating advantages.

Figure 3:
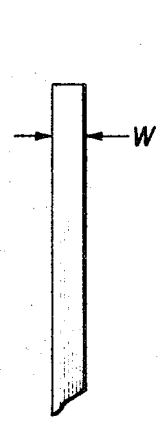
FIGS. 3, 4, and 5 illustrate the forms of some ribbonlike strands suitable for use as synthetic fronds in the reef structure.

The simplest yet satisfactory frond material is in the form of a flat ribbon, as illustrated in FIG. 3, and may be made by slitting extruded or cast plastic film. The width "w" of the ribbon may range from 0.5 to 8.0 inches, but preferably is 1 to 5 inches; except for very long fronds a narrow plain ribbon does not provide sufficient total buoyant force to maintain itself erect longer than a few months or a year. The total thickness of the ribbon is not less than 3 mils nor greater than about 20 mils. Thinner film because of its large surface to volume tends to droop rapidly as accretions build up and it is easily torn; the stiff thicker ribbons are more difficult to attach to the base sheet and are more expensive to no practical advantage.

Figure 4:
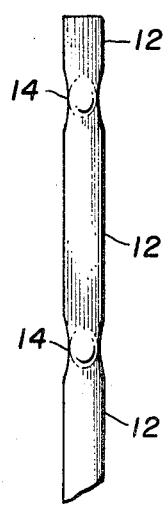
Figure 6:
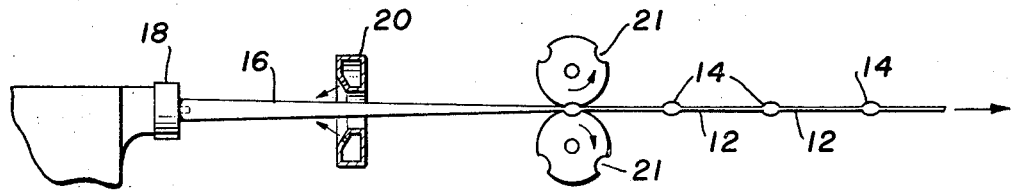
FIG. 6 illustrates schematically a conventional synthetic polymer extruder system producing ribbonlike strands having the form shown in FIG. 4.

FIG. 4 illustrates a useful modified frond ribbon, the flat ribbon segments 12 being interrupted intermittently by gas pockets or bubbles 14. This modification permits the use of denser polymeric materials, such as polyamides and polyesters, in fronds and is also useful with less dense materials that do not provide a sufficient degree of buoyancy in a particular marine environment. Bubble ribbons are readily produced by conventional extrusion techniques as illustrated schematically in FIG. 6. Small plastic tubes 16 extrude from die 18, which includes a conventional air mandrel system to inflate the molten tube, and are partially cooled by a cooling ring 20 that directs streams of water or cool air along the tube. The first pair of air mandrel seal rolls-feed rolls are heated and have mating longitudinal grooves 21 that periodically pass an uncollapsed bubble 14.

A variant of the modified ribbon is to use a blowing agent in ordinary film extrusion to foam the polymer, forming multiple voids; foamed ribbons tend to have low flexing durability, however. With either bubble or foam ribbons the pressure and temperature changes due to submersion must be carefully considered; a useful rule for initial trials is to calculate the gas bubble volume at ambient conditions necessary to provide neutral buoyancy at the sea floor and to triple this volume in the ribbons. Over an extended period of time counterdiffusion of water into and the gas out of the bubble substantially reduces the buoyancy of the frond; when working with a new untested frond material, therefore, it is advisable to subject specimens to hydrostatic tests in the laboratory or to immersion in the sea at pressures about double the expected pressure at the region of utilization.

Figure 5:

FIG. 5 illustrates another modified ribbon. Splittable-oriented plastic film, such as polypropylene, is slit into ribbon of the desired width. Usually after the ribbons have been attached to the base sheet or as the ribbon loop is cut, the free ends are rolled or beaten to initiate splitting, as indicated by numeral 22. Slow undulations or whipping of the frond in the reef causes further splitting and separation to form a tassellike free end on the frond.

Figure 9:
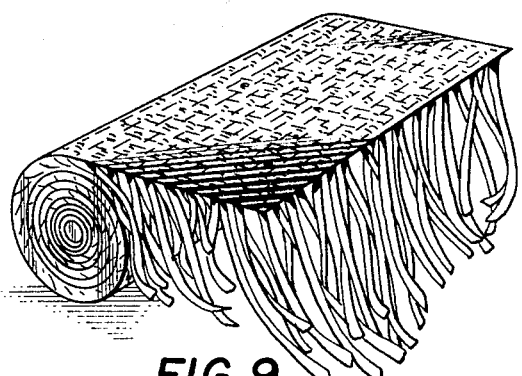
FIG. 9 illustrates a length of the synthetic reef assembly conveniently rolled up ready to be installed on the bottom of the sea.

The ends of the frond may be attached to the base sheet by many different methods, such as by pushing a short ribbon loop through the sheet and threading a strong monofilament or narrow ribbon through successive loops and binding the ends of the monofilament. The frond ends may also be affixed to the base with a curable adhesive. One efficient method is to knit the base sheet fabric and insert the frond ribbons simultaneously, the stitches of the knit fabric being drawn tight around the end of the ribbon. This operation may be performed on a raschel knitter modified by a pneumatic jet to blow the ribbon stock through the net at the knitting head; the complete assembly, base with fronds may be rolled up directly into a convenient package, as illustrated in FIG. 9. A roll sufficient to cover a 250—300 yard length of the sea floor is only about 5 feet in diameter when wound on a 6-inch core.

The actual straight length of the fronds depends upon the particular marine environment in which the reef is to be installed. Generally, however, fronds less than about 3 feet long do not have an adequate life expectancy. Preferably, the fronds are from 5 to 50 feet long, the generally most useful range being about 6 to 25 feet. In any actual reef installation it is desirable to have fronds of several differing lengths in order to provide shelter attractive to many varieties and sizes of fish and marine organisms. Similarly, the actual distribution of fronds ends across the base sheet ordinarily should not be uniform over a great area but should have some built-in variation. Typically, the distance between an attached frond end and its nearest neighbor should be in the range of 2 to 30 inches; it is frequently advantageous to form the fronds in clusters with several ribbons attached at a single spot.

Reefs according to the invention may be installed in comparatively shallow water in calm inland lakes but the invention's greatest utility is the cultivation of marine fish in water at least 30 feet deep. At lesser depths the energy of surface waves and tidal action usually create such shoaling currents that the reef is difficult to lay and anchor initially, and is rapidly silted in until the effective volume is greatly reduced.

The reef is usually laid out on a selected path along the sea floor as a series of parallel discontinuous strips that differ intermittently in some principal factor such as frond length and frond distribution. The continuous width of the reef may be made as great as desired by laying successive abutting parallel strips. For commercial use a synthetic reef less than about 12 feet wide is usually inefficient; the actual width desired may be determined by other consideration, however. For example, if bottom-dwelling fish are to be harvested from the reef with an otter trawl, the reef width should be about one-half to three-fourths the width of the mouth of the trawl net, and lanes on the sea floor spaced apart about the distance of the sideboards of the trawl lines should be left uncovered; as trawling proceeds along the length of the reef the fronds bend over and pass under the trawl unharmed as the fish are flushed out into the mouth of the net. This flexibility of the synthetic reef is a major practical advantage over the conventional rigid artificial reef of concrete or stone; it is similarly advantageous when low-lying seines are used to harvest schools of fish above the reef.

Figure 7:
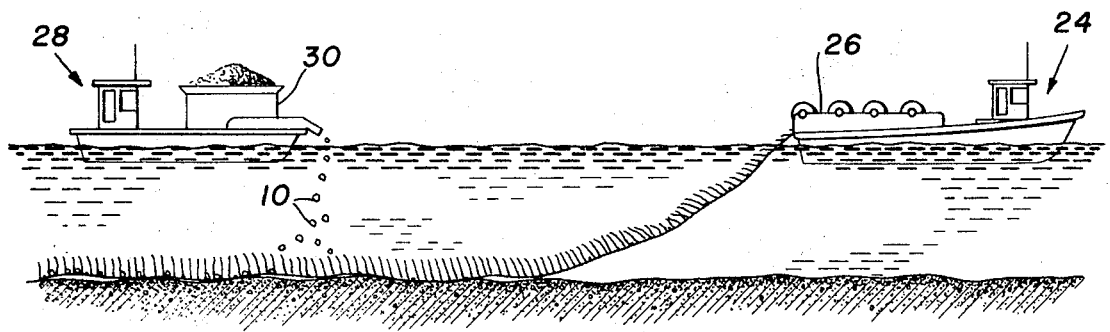
FIG. 7 is a schematic illustration with rather distorted scale of one method of installing the synthetic reef structure on the sea floor.
Figure 8:
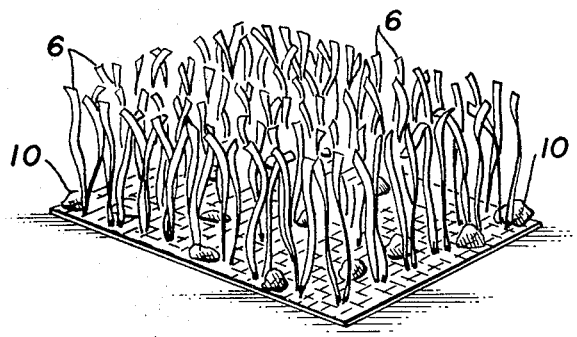
FIG. 8 shows a small portion of a synthetic reef installed by the method illustrated in FIG. 7.

Small synthetic reefs may be installed by simply casting the structure overboard and having free divers guide it to the bottom and anchor it there. Such a procedure is much rather expensive for commercial scale reefs, however. One practical procedure is illustrated in FIG. 7. A long self-driven flat boat or barge 24, loaded with rolls similar FIG. 9 to total at least one mile of reef strip, is provided with a roll rack 26 and letoff drive on its stern. The reef strip, unrolled at a controlled rate, falls over a guide plane into the water and slowly sinks. A tender ship 28 follows the barge at a distance of 50 to 75 yards; the tender has a large bin 30 equipped with a conveyor that terminates in a spout projecting over the bow of the ship. The bin is loaded with coarse cracked rock or coarse shells dredged up inshore. The weights or rocks 10 discharge from the spout and settle at random onto the base sheet of the reef. Two free divers (not shown) tethered to the tender and having direct communication with the pilot of the tender observe the settling of the reef strip and the auxiliary ballast weights 10. The divers direct the course of the tender and occasionally the rate at which the reef strip is fed into the sea; in this manner the effects of local water currents on the drift and lay of the reef and ballast stones are compensated. A portion of the newly laid reef strip appears as indicated in FIG. 8. By this procedure it is practicable for a fleet of only three small ships to lay several miles of reef strip in a single day.

EXAMPLE

The effectiveness of synthetic reefs according to the invention was checked by installing two small test reefs in the Gulf of Mexico offshore from Pensacola, Florida in water 50 feet deep. In one reef, ribbon fronds were attached to a base sheet of woven nylon fabric 4 feet wide by 30 feet long; each frond was polypropylene ribbon 1½ inches wide, 5 mils thick, and 4 feet long (free length). This structure was anchored by placing across the base sheet four steel bars, 8 feet long by 1 inch in diameter. The base sheet of the second reef was 50 feet long and 5 feet wide, and was comprised of 6-inch mesh reinforcing steel wire net; the wire mesh was coated with a rubber paint to reduce corrosion. Polypropylene ribbons 2½ inches wide, 10 mils thick, and 10 feet long were attached to the wire net base; the net buoyant force acting on these fronds was about eight times greater than the force on the smaller fronds of the first reef.

The test reefs were installed in midspringtime and were observed periodically by divers who collected specimens. By early autumn a diverse colony of marine organisms had become established, including members of the classes tunicates, hydroids, and bryozoans, sea snails, and fungal plant colonies growing on the surface of the fronds. A variety of marine fish clustered around the reefs including fairly large schools of amberjacks. The short fronds of the first reef showed some loss of buoyancy due to accretions and somewhat resembled those illustrated in FIG. 2 while larger fronds of the second reef remained erect as indicated in FIG. 1.

Reefs according to the invention have many practical advantages. In relation to the effective volume, the cost of materials, hauling, and installation is very low compared with artificial reefs of the prior art. The principal structure can be preassembled to provide wide variety in depth (frond length) and internal physical boundaries (frond distribution) to suit the particular ecological and hydraulic conditions of the region, and the preassembled reef can be installed rapidly over a wide area while weather and surface wave conditions are favorable; the plastic materials are practically inert to chemical corrosion by sea water and may be split, crimped, colored or otherwise modified to provide a wide range of utility and convenience. The fronds are virtually "transparent" to sonar, producing negligible echo; this permits use of sonar to locate schools of fish in the neighborhood of the reefs, and is an advantage by national defense considerations.

I claim:

1. A snythetic reef for installation on the floor of large bodies of water to provide for colonizing of harvestable fish therefrom comprising:
   a.a. a flexible perforated base material adapted to follow the contour of the floor and weighted sufficiently so that the reef is submergible to the water body floor; and
   b. a plurality of outwardly extending spaced-apart thin elongated ribbonlike members attached at one of their ends to said base material and having a density sufficiently low so that when the reef is submerged the other ends of the members will tend to float upward.

2. The reef of claim 1 wherein the base material is perforated to provide at least 35 percent open area, preferably 75—95 percent.

3. The reef of claim 2 wherein the base material is made of a polyolefin.

4. The reef of claim 3 wherein the ribbonlike members have gross density in the range of about 0.80 to 0.97 grams per cubic centimeter.

5. The reef of claim 4 wherein the ribbonlike members are made of long narrow polypropylene or polyethylene plastic films having a width of in the range of 0.5 to 8.0 inches and a thickness in the range of 3 to 20 mils.

6. The reef of claim 1 including spaced-apart iron bars for weighting down the reef.

7. A method of installing a synthetic reef on the floor of large bodies of water to provide for colonizing of harvestable fish comprising:
   a. providing a reef composed of an elongated flexible perforated base material adapted to follow the contour of the floor and weighted sufficiently so that the reef is submergible to the water body floor and a plurality of spaced-apart thin elongated ribbonlike members attached at one of their ends to the base material and having a density sufficiently low so that when the reef is submerged the other ends of the members will tend to float upward;
   b. winding the reef in a roll;
   c. unrolling the reef from a watercraft moving above the floor of a body of water;
   d. depositing and submerging the reef in the body of water; and
   e. settling the reef on the floor so the ribbonlike members float upward.

8. The method of claim 7 including weighting the deposited and submerged reef by dropping heavy discrete solid bodies randomly onto the reef.